US007915768B2

(12) United States Patent
Vaucher et al.

(10) Patent No.: US 7,915,768 B2
(45) Date of Patent: Mar. 29, 2011

(54) LINEAR GUIDE WITH AN INTEGRATED LINEAR MOTOR

(75) Inventors: Jean-Marc Vaucher, Couvet (CH);
Ralph Coleman, Fleurler (CH); Kevin Derabasse, Pittsburgh, PA (US)

(73) Assignee: Etel S.A., Môtiers (CH)

( * ) Notice: Subject to any disclaimer, the term of this patent is extended or adjusted under 35 U.S.C. 154(b) by 45 days.

(21) Appl. No.: 12/313,978

(22) Filed: Nov. 26, 2008

(65) Prior Publication Data
US 2009/0152961 A1      Jun. 18, 2009

(30) Foreign Application Priority Data

Nov. 30, 2007   (DE) .......................... 10 2007 057 833

(51) Int. Cl.
*H02K 41/02*   (2006.01)
(52) U.S. Cl. ............... 310/12.19; 310/12.05; 310/12.06; 310/12.24; 310/12.25; 310/12.31
(58) Field of Classification Search ............... 310/12.05, 310/12.06, 12.31, 12.19, 12.24, 12.25
See application file for complete search history.

(56) References Cited

U.S. PATENT DOCUMENTS

| 5,216,590 | A  | * | 6/1993 | Ota .................................. 700/60 |
| 6,348,746 | B1 | * | 2/2002 | Fujisawa et al. .......... 310/12.24 |
| 6,564,732 | B1 | * | 5/2003 | Hosagasi et al. ............... 112/239 |
| 6,570,273 | B2 | * | 5/2003 | Hazelton .................... 310/12.25 |
| 2004/0178327 | A1 | * | 9/2004 | Widdowson et al. ......... 250/221 |
| 2007/0090696 | A1 | * | 4/2007 | Sugita et al. .................... 310/12 |
| 2008/0246348 | A1 |   | 10/2008 | Angelis et al. |

FOREIGN PATENT DOCUMENTS

| DE | 10 2005 023 984 A1 |   | 11/2006 |
| JP | 2006084034 A | * | 3/2006 |
| WO | WO 2007/024031 A1 |   | 3/2007 |
| WO | WO 2007/026270 A1 |   | 3/2007 |

OTHER PUBLICATIONS

Machine Translation JP2006084034 (2006).*

* cited by examiner

*Primary Examiner* — Quyen Leung
*Assistant Examiner* — Jose A Gonzalez Quinones
(74) *Attorney, Agent, or Firm* — Brinks Hofer Gilson & Lione

(57) ABSTRACT

A linear guide with an integrated linear motor, the linear guide having a stationary support extending in a guide direction, a table movable in the guide direction and a linear motor. The linear motor includes 1) a movable element connected with the table, 2) a stationary element connected with the stationary support and contactless bearings between the stationary support and the table and 3) an electromagnetic positioner based on electromagnetic interaction for positioning the table transversely in relation to the guide direction. The linear guide includes an integrated position-measuring system having a scale and scanning heads which detect a position of the table in the guide direction and a deviation direction, which lies transversely in relation to the guide direction and parallel in relation to a plane of an air gap of the linear motor. The electromagnetic positioner acts in such a way so that the table is positioned in the deviation direction.

14 Claims, 3 Drawing Sheets

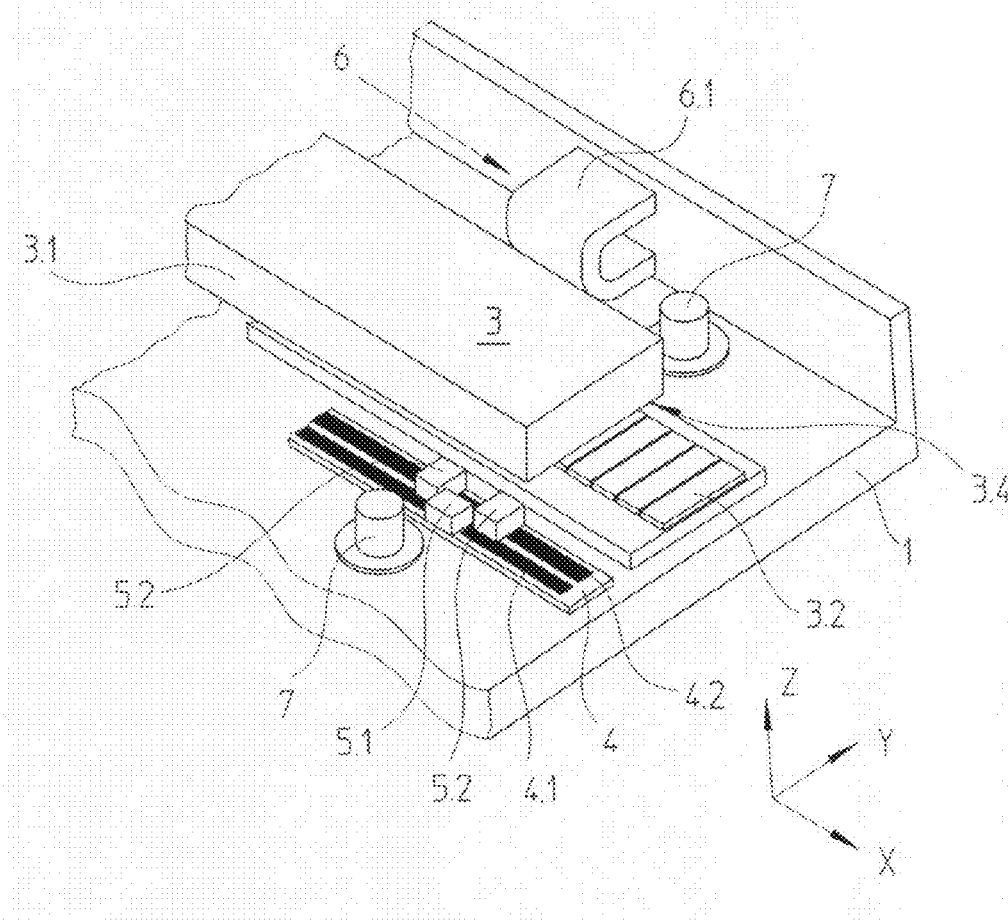

LINEAR GUIDE WITH AN INTEGRATED LINEAR MOTOR

RELATED APPLICATIONS

Applicants claim, under 35 U.S.C. §119, the benefit of priority of the filing date of Nov. 30, 2007 of a German patent application, copy attached, Serial Number 10 2007 057 833.6, filed on the aforementioned date, the entire contents of which is incorporated herein by reference.

BACKGROUND

1. Technical Field

The present invention relates to a linear guide with an integrated linear motor, in which the position of the movable element transversely to the drive direction can be actively affected, for example for correcting track deviations. Such linear guides are used for the exact positioning of objects.

2. Background Information

Advances in the field of microelectronics in particular make it necessary for objects, such as wafers or electronic components, to be positioned always faster and always more accurately. If it is intended in the course of this to provide a particularly low-friction seating of the movable elements, the employment of air-cushioned linear guides is known, in which the movable element is kept spaced apart from the stationary element by an air cushion. A linear motor, which provides the drive in the desired guide direction, can be integrated into such a guide. It is disadvantageous that such air-cushioned guides are not particularly stiff transversely to the guide direction, so that positioning transversely to the guide direction cannot be performed with the required accuracy.

WO 2007/024031 A1 describes a linear guide in which a movable platform is conducted in a contactless manner at a defined distance from a surface linearly along this surface. On the one hand, electromagnets at the four corners of the platform provide for the preloading of the bearing, on the other hand they are used for maintaining the distance from the platform constant, and in this way for compensating deviations perpendicularly with respect to the surface. However, a deviation perpendicularly to the guide direction and parallel to the surface cannot be corrected by this system.

WO 2007/026270 A1 describes an ironless linear motor, whose coils are arranged in the magnetic field of the stator in such a way that the linear motor can be used as a drive mechanism in two directions, which extend perpendicularly to each other. By this it is possible, for example, to advantageously operate a pick-and-place machine.

Position-measuring arrangements are known from DE 102005023984 A1 which have, besides an incremental track on a scale for measuring a displacement in one measuring direction, an additional incremental track, which can detect small displacements transversely to the actual measuring direction.

OBJECTS AND SUMMARY OF THE INVENTION

It is an object of the present invention to produce a linear guide with an integrated linear motor, by which an object can be positioned in a particularly accurate manner.

This object is attained by a linear guide with an integrated linear motor, the linear guide having a stationary support extending in a guide direction, a table movable in the guide direction and a linear motor. The linear motor includes 1) a movable element connected with the table, 2) a stationary element connected with the stationary support and contactless bearings between the stationary support and the table and 3) an electromagnetic positioner based on electromagnetic interaction for positioning the table transversely in relation to the guide direction. The linear guide includes an integrated position-measuring system having a scale and scanning heads which detect a position of the table in the guide direction and a deviation direction, which lies transversely in relation to the guide direction and parallel in relation to a plane of an air gap of the linear motor. The electromagnetic positioner acts in such a way so that the table is positioned in the deviation direction.

A linear guide with an integrated linear motor has a stationary support extending in the guide direction, a table, which is movable in the guide direction, and a linear motor, whose movable portion is connected with the table and whose stationary portion is connected with the support. The linear guide furthermore has contactless bearings between the support and the table, as well as an electromagnetic positioner based on electromagnetic interaction for positioning the table transversely with respect to the guide direction. The linear guide furthermore has an integrated position-measuring system with a scale and scanning heads, by which the position of the table can be detected in the guide direction, as well as in a deviation direction, which is located transversely to the guide direction and parallel to a plane of an air gap of the linear motor. This electromagnetic positioner acts so the table can be positioned in the deviation direction.

A guide with an integrated linear motor constructed in this way makes possible very exact positioning in an extended guide direction, and within defined limits also transversely to the guide direction in the deviation direction. By this it is for example possible to correct guidance errors transversely to the guide direction. Since the guide operates in a contactless manner, the accuracy of positioning is not dependent on the quality or degree of wear of a guide rail. Furthermore, no abraded material is produced, so that such guides are particularly well suited for clean room applications.

Further advantages, as well as details of the instant invention ensue from the following description of a preferred embodiment, making reference to the drawings.

BRIEF DESCRIPTION OF THE DRAWINGS

FIG. 4 shows a further exemplary embodiment of a linear guide in a spatial representation in accordance with the present invention.

DETAILED DESCRIPTION OF THE PREFERRED EMBODIMENTS

Figure 1:
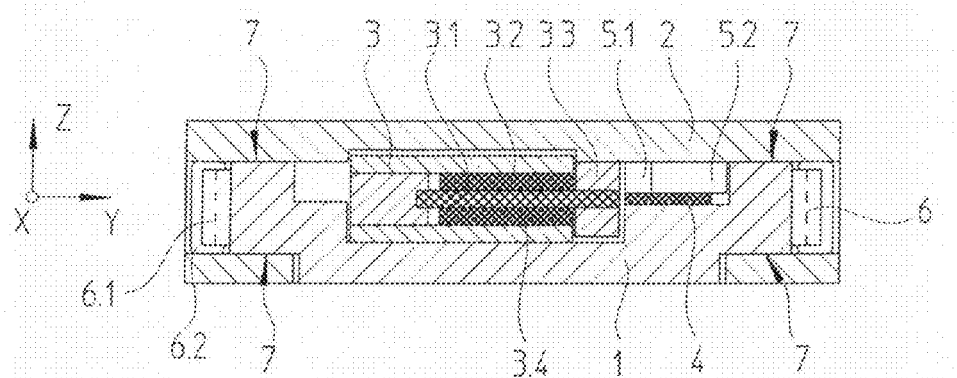
FIG. 1 shows a sectional view of an embodiment of a linear guide in accordance with the present invention.

FIG. 1 shows a sectional view of a linear guide with an integrated linear motor in accordance with the first exemplary embodiment. The guide direction X extends perpendicularly with respect to the drawing plane. The linear guide has a stationary support 1 and a table 2, which is movable with respect to the former and on which the load to be moved can be fastened. An ironless linear motor 3 is integrated into this linear guide and provides the advance of the table 2. The primary element of the linear motor 3 with its coils 3.1 is connected with the table by a coil holder 3.3 and is therefore movable relative to the support 1. Since this is an ironless linear motor, the coils 3.1 have not been wound around iron cores, but instead have been cast into a flat support made of synthetic resin, for example. Because of the omission of iron cores, the weight to be moved is reduced, so that it is easier to accelerate the table. This is advantageous in particular in the case in which the load to be moved is small, such as in connection with a pick-and-place machine used in the electronics industry. Moreover, no reluctance forces act in an ironless linear motor. This has a great advantage, in particular in connection with air-cushioned seating.

The secondary element of the linear motor 3 with its magnets 3.2 is connected with a support 1 and is designed in such a way that magnets 3.2 are arranged on both sides of the coils 3.1, wherein magnets 3.2 which are located oppositely each other have the same magnetizing direction, but magnets 3.2 located side-by-side are oppositely magnetized.

A flat air gap 3.4 is located between the coils 3.1 and the magnets 3.2. The guide direction X and the deviation direction Y lie parallel in relation to the plane of this air gap 3.4 and lie perpendicularly with respect to each other.

The table 2 wraps around the support 1 on both sides of the linear guide, so that air bearings 7 can be arranged in such a way that they are a mutually preloaded by each other. Four air bearings 7 can be seen in the sectional representation of FIG. 1, of which respectively two are arranged in the Z-direction in such a way that they mutually preload each other. In this way it is possible to assure quiet running of the table 2 along the support 1.

The linear guide is laid out in such a way that the force exerted by the linear motor 3 on the movable element (2, 3.1, 3.3) acts in the center of gravity of the latter. In this way no torque is generated in the course of acceleration and braking, no forces then act on the air bearings 7.

Furthermore, magnetic bearings 6 are arranged in the lateral wraparounds of the table, which are electromagnets with respectively a horseshoe-shaped yoke 6.1 and a coil 6.2 wound around the yoke. These magnetic bearings 6 can cause attractive forces between the support 1 and the table 2. By respectively two of such magnetic bearings 6 arranged opposite each other in the Y-direction, the table can be slightly shifted in the Y-direction, and therefore transversely to the guide direction X, in the table plane X-Y.

Figure 2:
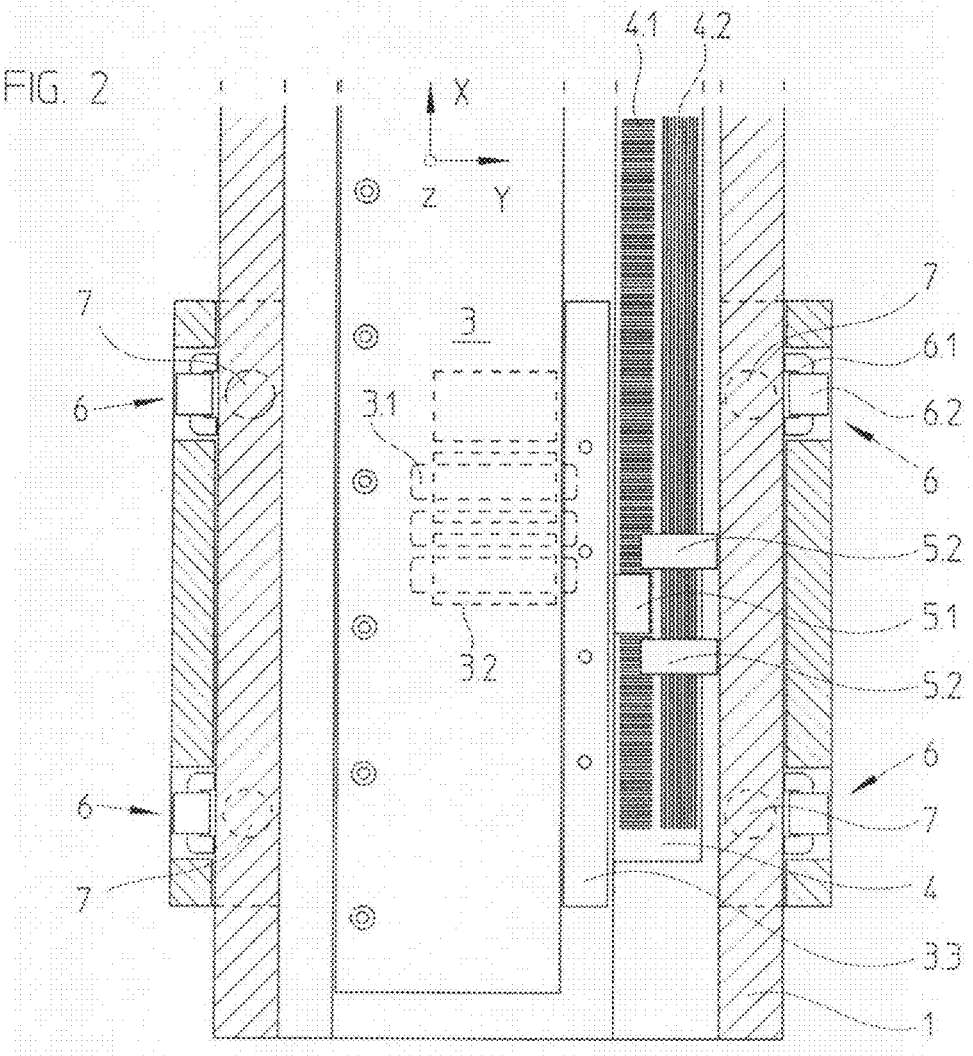
FIG. 2 shows the linear guide of FIG. 1 in a view from above.

It can be seen in FIG. 2 (a sectional view underneath the table top), that two such magnetic bearings 6 are provided, offset in the X-direction, so that the table can also be slightly rotated around the Z-axis.

The arrangement of the air bearings 7 can also be seen in FIG. 2, and four pairs of air bearings 7, which respectively preload each other, are represented. Thus, in the exemplary embodiment shown, four magnetic bearings 6 and eight air bearings 7 are employed. Of course, the number of the magnetic and of the air bearings can be matched to the respective conditions. It is in particular possible to distribute many air outlet nozzles over larger surfaces.

The linear guide represented in FIGS. 1 and 2 has three degrees of freedom, which can be set very accurately by suitable control circuits. Thus, the table 2 can of course be shifted by the linear motor 3 in the guide direction X. In addition, the table 2 can also be shifted transversely with respect to the guide direction X (i.e. in the Y-direction), and additionally rotated around an axis perpendicularly with respect to the table (i.e. around the Z-axis). The first degree of freedom (translation in X) is used for the actual application, the two additional controllable degrees of freedom (translation in Y, rotation around Z) are for example used for compensating errors in the mechanical portion of the arrangement, which otherwise could have an effect on positioning. A tool arranged at the edge of the table 2 also moves in the X-direction when the table rotates around a centrally arranged Z-axis. Thus, the avoidance of such rotations improves the positioning in the X-direction.

However, the two additional degrees of freedom can also be used for positioning the table 2. Although no large paths are possible, in some applications an additional movement possibility in the deviation direction of some micrometers, or respectively a rotation around the Z-direction of some minutes of arc, can be useful. An example for such an application would be a station for inspecting a wafer under a microscope in the course of the manufacture of integrated circuits. Here, the additional degrees of freedom permit the exact alignment of a mechanically pre-adjusted wafer.

Information obtained from a special position-measuring system integrated into the linear guide is required by the control circuits for positioning the table 2. Thus, a scale 4 with two tracks 4.1 and 4.2 is connected with the support 1. The first track 4.1 is a conventional incremental track, whose graduation lines extend transversely in the Y-direction with respect to the guide direction X. The position of the table 2 in the X-direction can be very accurately determined by scanning and counting these graduation lines by means of a scanning head 5.1 and, if needed, by interpolation, and in this way it can be controlled to assume a new nominal position.

The second track 4.2 of the scale 4 is a so-called straightness track, whose graduation lines lie substantially parallel with respect to the guide direction X. The advantages of a small deviation from this parallelism and other advantageous designs of such scales are explained in DE 102005023984 A1 mentioned in the introduction and to whose content reference is expressly made.

It is possible to determine the position of the table 2 in the Y-direction by the straightness track 4.2. If two scanning heads 5.2, which are braced in relation to each other in the guide direction X, are used for the position value determination, the shifting of the table 2 transversely in relation to the guide direction X is obtained by calculating the mean of the two determined positions. A conclusion regarding the rotation of the table 2 around the Z-axis can be drawn by forming the difference. All scanning heads 5.1, 5.2 are connected with the table 2 and thus are seated movably with respect to the scale 4.

By a suitable control of the magnetic bearings 6 it is possible in this way to compensate the linear shifting of the table 2 in the Y-direction, as well as the rotation of the table 2 around a Z-axis and to regulate it to zero or another nominal value (near zero because of the restricted freedom of movement).

Figure 3:
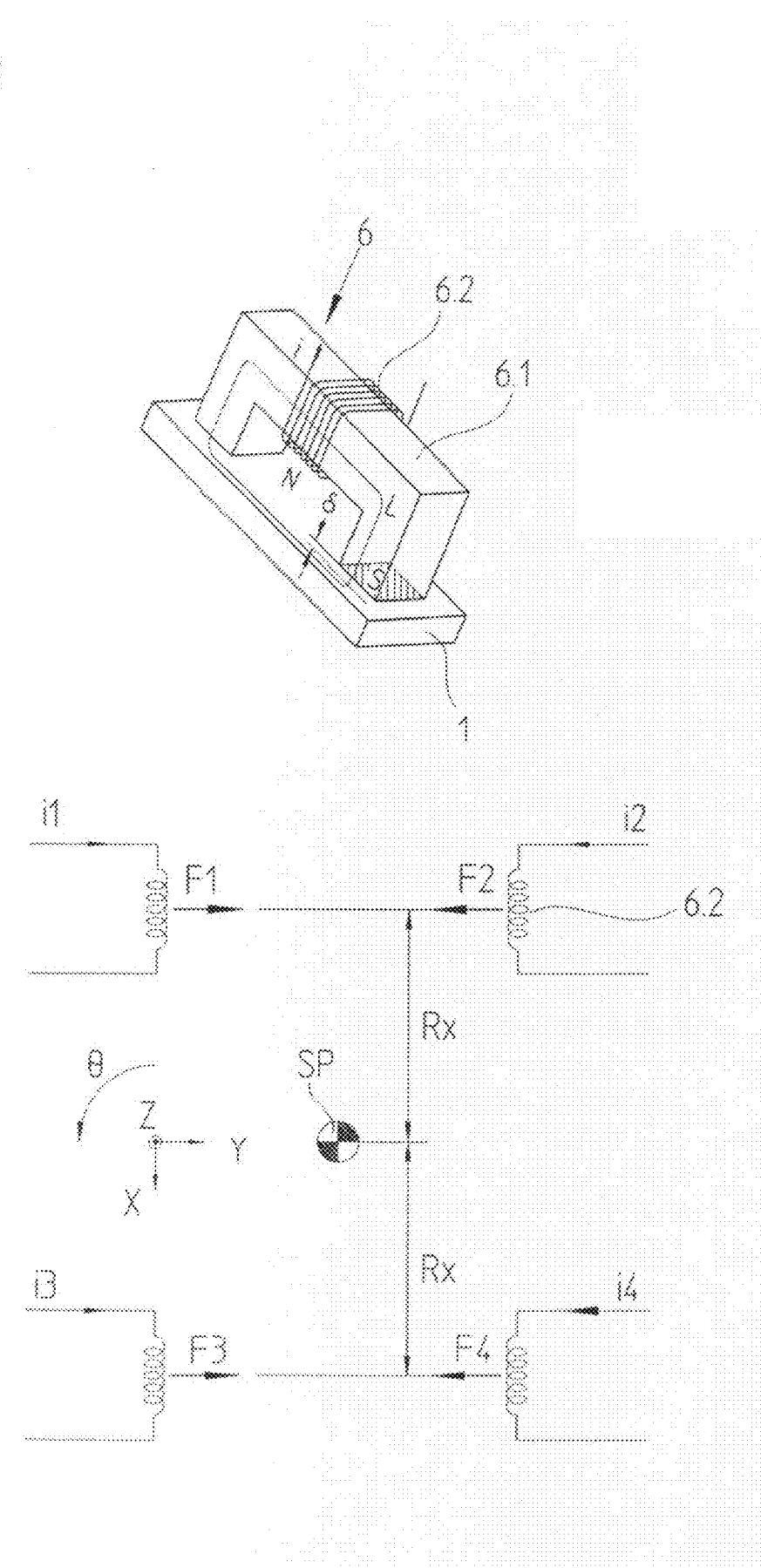
FIG. 3 represents basic diagrams regarding the derivation of an embodiment of a regulation arrangement to be used with the linear guides of FIGS. 1 and 4 in accordance with the present invention.

The values important for deriving a regulation arrangement are represented in FIG. 3. To make this control simpler, the four magnetic bearings 6 (as indicated in FIG. 2 and in the left half of FIG. 3) are symmetrically arranged in relation to the center of gravity SP of the table 2. Rx is the distance between the magnetic bearings 6 and the center of gravity SP in the guide direction, the air gap between the yoke 6.1 of a magnetic bearing and the support 1 is identified by $\delta$.

Each magnetic bearing generates a force F1, F2, F3, F4, which can be approximately calculated by the equation (1). The values shown in FIG. 3 are used.

$$F_k = \frac{\mu_0 S}{(L/\mu_r + 2\delta_k)^2} \cdot (Ni_k)^2 = \alpha \cdot \frac{i_k^2}{(\beta + 2\delta_k)^2} \quad (1)$$

In equation 1, $\mu_r$ is the relative permeability of iron, N is the number of windings of the coil 6.2, L is the length of the magnetic circuit closed over the yoke 6.2, S is the exit surface of the magnetic field at the yoke 6.1, $\alpha$ and $\beta$ are constants. If the position of the table in relation to y and $\theta$ is known (as explained above, this information is obtained by scanning the straightness track 4.2 of the scale 4 by two scanning heads 5.2), it is possible to calculate the air gaps of the four magnetic bearings in accordance with equation (2).

$$\begin{cases} \delta_1 = \delta_0 - y + R_x\theta \\ \delta_2 = \delta_0 + y - R_x\theta \\ \delta_3 = \delta_0 - y - R_x\theta \\ \delta_4 = \delta_0 + y + R_x 0 \end{cases} \quad (2)$$

In equation (2), $\delta_0$ is the nominal air gap, which is fixed by the construction for the case y=0 and $\theta$=0.

The movement equations (3) of the system can be calculated by considering the forces acting at each magnetic bearing 6 and depend on the position of the table 2 and the electrical currents i1, i2, i3, i4 flowing in the coils 6.2 of the magnetic bearings 6.

$$\begin{cases} J \cdot \ddot{\theta} = R_x(F_2 - F_1 + F_3 - F_4) \\ m \cdot \ddot{y} = F_1 - F_2 + F_3 - F_4 \end{cases} \quad (3)$$

Two degrees of freedom must be regulated by four nominal electrical currents. Equation (4) reduces the number of nominal electrical currents.

$$\begin{cases} i_1 = I_0 - i_\theta + i_y \\ i_2 = I_0 + i_\theta - i_y \\ i_3 = I_0 + i_\theta + i_y \\ i_4 = I_0 - i_\theta - i_y \end{cases} \quad (4)$$

Here, $I_0$ is the electrical current for preloading the magnetic bearings. This electrical current can also be zero if permanent magnets are being used instead. In this way the number of nominal electrical currents is reduced to two ($i_\theta$ and $i_y$). The position of the table 2 can be set with these.

Because of the unstable and non-linear behavior of such magnetic bearings 6, complex regulating structures are required, such as have already been used for some time in the area of magnetic bearings. These regulating structures are not subject of the instant invention and will not be represented in greater detail.

It should be noted at this point that the first exemplary embodiment can be modified in that the magnetic bearings 6 are omitted and in place thereof an arrangement in accordance with WO 2007/026270 A1, cited at the outset, is selected. Here, the linear motor has two ironless primary elements, which are arranged one behind the other and can be separately controlled. It is important in this case that areas of the coils of the motors which extend in the guide direction are arranged between the magnets (in FIG. 2, coils 3.1 and magnets 3.2 have been indicated, all these areas are here located outside of the magnets). The Lorentz force which here acts on the charges, which are moved in these coil areas, permits a positioning such as had previously been made possible by the magnetic bearings 6. In this way the table can be moved and positioned by each primary element in the guide direction X and the deviation direction Y. By controlling the two primary elements in opposite directions it is possible to provide a rotation of the table around the axis Z. The movements in the additional degrees of freedom possible with this variation can be clearly greater (some millimeters, or respectively some degrees) than in the first exemplary embodiment.

This variant of the first exemplary embodiment has in common with the previously described variation with magnetic bearings that means which are based on electromagnetic interaction exist for positioning the table 2 in positions different from the guide direction X.

FIG. 4 shows a further exemplary embodiment, in which an iron-core linear motor is employed, whose coils in the primary element are wound around the teeth of an iron core. Such linear motors have greater mass, but can also generate clearly greater forces for moving heavy loads.

Only the essential components are represented in FIG. 4. The table is not represented in order to allow a view of the more important components. The secondary element of the linear motor with its magnets 3.2 is fastened on the support 1. A flat air gap 3.4 is located between the primary element and the secondary element. The scale 4 with both its tracks 4.1 and 4.2 is fastened on the support parallel with the secondary element. The secondary element and the scale extend in the guide direction X. The primary element, in which the coils 3.1 of the linear motor 3 and its iron core are contained, is located above the secondary element. Scanning heads 5.1, 5.2 are arranged above the scale 4. The scale 4 and the scanning heads 5.1, 5.2 work together as in the first exemplary embodiment.

Air bearings 7 maintain the non-represented table spaced apart from the support 1. This time, the magnetic attraction between the magnets 3.2 of the secondary element and the iron core of the primary element provides for the preloading of the air bearings, so that here only four air bearings are needed. However, the attractive force between the primary and secondary elements of an iron-core linear motor is dependent on the operational state. If the attractive force fluctuates too much, additional measures for preloading the air cushions, such as additional permanent magnets or vacuum suction plates, can become necessary.

Magnetic bearings 6, of which only a yoke 6.1 is represented, which is oriented to the lateral wall of the support 1, here again provide the lateral positioning capability. The primary element of the linear motor 3, the scanning heads 5.1, 5.2 and the magnetic bearings 6 are connected with the movable table of the linear guide. Otherwise, the mode of functioning of this arrangement corresponds to that of the first exemplary embodiment.

The foregoing description is provided to illustrate the present invention, and is not to be construed as a limitation. Numerous additions, substitutions and other changes can be made to the present invention without departing from its scope as set forth in the appended claims.

We claim:

1. A linear guide with an integrated linear motor, the linear guide comprising:
   a stationary support extending in a guide direction;
   a table movable in said guide direction;
   a linear motor comprising:
   a movable element connected with said table;

a stationary element connected with said stationary support;

contactless bearings between said stationary support and said table; and an electromagnetic positioner based on electromagnetic interaction for positioning said table transversely in relation to said guide direction;

an integrated position-measuring system comprising:

a scale;

scanning heads which detect a position of said table in said guide direction and a deviation direction, which lies transversely in relation to said guide direction and parallel in relation to a plane of an air gap of said linear motor; wherein said electromagnetic positioner acts, based on said position of said table detected in said deviation direction, in such a way so that said table is positioned in said deviation direction.

2. The linear guide in accordance with claim 1, wherein said scale comprises:

a first incremental graduation comprising first graduation structures that lie transversely in relation to said guide direction; and a second incremental graduation comprising second graduation structures that lie substantially parallel in relation to said guide direction.

3. The linear guide in accordance with claim 2, wherein said second incremental graduation is scanned by two of said scanning heads, which are spaced apart from each other in said guide direction, so that a position deviation of said table in said deviation direction, as well as a rotation of said table around an axis perpendicularly in relation to said plane of said air gap, can be measured, and regulated to a nominal value.

4. The linear guide in accordance with claim 1, wherein said linear motor comprises an ironless primary element which is equipped with coils and is connected via a coil holder with said table, and wherein said linear motor comprises a secondary element provided with magnets, which is connected with said stationary support, wherein said coils and said magnets interact for moving and positioning said table in said guide direction.

5. The linear guide in accordance with claim 4, wherein said table is guided by several air bearings, which preload each other in a contactless manner in relation to said stationary support.

6. The linear guide in accordance with claim 4, wherein said electromagnetic positioner comprises magnetic bearings respectively constituted by a yoke and a coil, and which respectively exert an attractive force in said deviation direction between said stationary support and said table.

7. The linear guide in accordance with claim 6, wherein said magnetic bearings are arranged in such a way that said table can be shifted in said deviation direction and rotated around an axis perpendicularly to said plane of said air gap.

8. The linear guide in accordance with claim 4, wherein said linear motor comprises two ironless primary elements, which are connected with said table and can be separately controlled and are arranged with respect to said magnets of said secondary element in such a way that said table can be moved and positioned by each of said two ironless primary elements in said guide direction and in said deviation direction.

9. The linear guide in accordance with claim 8, wherein control of said two ironless primary elements in opposite directions can cause a rotation of said table around an axis perpendicularly in relation to said plane of said air gap.

10. The linear guide in accordance with claim 1, wherein said linear motor comprises a primary element equipped with coils, in which said coils are wound around an iron core and said primary element is connected with said table, and said linear motor comprises a secondary element provided with magnets, which is connected with said stationary support, wherein said coils and magnets interact with each other in order to move and position said table in said guide direction.

11. The linear guide in accordance with claim 10, wherein said table is conducted by several air bearings in a contactless manner in relation to said stationary support, wherein said several air bearings are preloaded by an attractive force between said magnets and said iron core of said primary element.

12. The linear guide in accordance with claim 10, wherein said electromagnetic positioner comprises magnetic bearings, which are respectively constituted by a yoke and a coil, which respectively exert an attractive force in said deviation direction between said stationary support and said table.

13. The linear guide in accordance with claim 12, wherein said magnetic bearings are arranged in such a way that said table can be shifted in said deviation direction and rotated around an axis perpendicularly to said plane of said air gap.

14. The linear guide in accordance with claim 1, wherein said electromagnetic positioner is a sole source for positioning said table in said deviation direction.

* * * * *